US011687271B1

(12) United States Patent
Ding et al.

(10) Patent No.: US 11,687,271 B1
(45) Date of Patent: Jun. 27, 2023

(54) METHOD FOR DILUTING CACHE SPACE, AND DEVICE AND MEDIUM

(71) Applicant: INSPUR SUZHOU INTELLIGENT TECHNOLOGY CO., LTD., Jiangsu (CN)

(72) Inventors: Zengqiang Ding, Jiangsu (CN); Bo Yuan, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/928,150

(22) PCT Filed: Feb. 19, 2021

(86) PCT No.: PCT/CN2021/076932
§ 371 (c)(1),
(2) Date: Nov. 28, 2022

(87) PCT Pub. No.: WO2021/244067
PCT Pub. Date: Dec. 9, 2021

(30) Foreign Application Priority Data

Jun. 5, 2020 (CN) .................. 20201050505017.8

(51) Int. Cl.
*G06F 3/06* (2006.01)
(52) U.S. Cl.
CPC .......... *G06F 3/0652* (2013.01); *G06F 3/0604* (2013.01); *G06F 3/0659* (2013.01); *G06F 3/0673* (2013.01)
(58) Field of Classification Search
CPC .... G06F 3/0652; G06F 3/0604; G06F 3/0659; G06F 3/0673; G06F 12/12; G06F 12/121;
(Continued)

(56) References Cited

U.S. PATENT DOCUMENTS 5,757,771 A * 5/1998 Li .................... H04L 49/3081
370/235
9,122,766 B2 * 9/2015 von Haden ........... H04L 67/568
(Continued)

FOREIGN PATENT DOCUMENTS

CN 106021445 A 10/2016
CN 109491928 A 3/2019
(Continued)

OTHER PUBLICATIONS

PCT/CN2021/076932 international search report.

*Primary Examiner* — Khoa D Doan
*Assistant Examiner* — Tong B. Vo
(74) *Attorney, Agent, or Firm* — IPro, PLLC

(57) ABSTRACT

A method includes: performing, at a preset initial speed, data deletion on a queue with the maximum length in the cache space (S1); in response to the length of the queue with the maximum length and subjected to the data deletion being equal to the lengths of multiple queues in the cache space, triggering data deletion on the plurality of queues (S2); calculating an allocation speed (S3); performing, at the allocation speed, data deletion on each queue, the data deletion of which is triggered (S4); in response to the lengths of all queues subjected to the data deletion being equal to the lengths of multiple other queues in the cache space, triggering the data deletion on the plurality of other queues, and returning to calculating the allocation speed (S5); and in response to triggering the stopping of diluting the cache space, pausing a data deletion process (S6).

20 Claims, 2 Drawing Sheets

(58) Field of Classification Search
CPC .... G06F 12/122; G06F 12/123; G06F 12/124; G06F 12/125; G06F 12/126; G06F 12/127; G06F 12/128; G06F 16/10; G06F 16/162; G06F 2212/7205; G06F 2212/60; G06F 2212/283; G06F 2212/282; G06F 2221/2143; G06F 3/0656; G06F 5/06; G06F 5/065; G06F 12/0871; G06F 16/24552; H04L 67/5682
See application file for complete search history.

(56) References Cited

U.S. PATENT DOCUMENTS

| | | | |
|---|---|---|---|
| 9,652,393 B1* | 5/2017 | Kang | G06F 9/5016 |
| 2016/0342359 A1 | 11/2016 | Kishi et al. | |
| 2018/0248813 A1* | 8/2018 | Zheng | G06F 12/0875 |
| 2018/0285270 A1* | 10/2018 | Sharma | G06F 12/0891 |
| 2018/0285281 A1* | 10/2018 | Sharma | G06F 12/12 |
| 2022/0188020 A1* | 6/2022 | Ishiguro | G06F 3/064 |

FOREIGN PATENT DOCUMENTS

| | | |
|---|---|---|
| CN | 110119487 A | 8/2019 |
| CN | 111736769 A | 10/2020 |

\* cited by examiner

METHOD FOR DILUTING CACHE SPACE, AND DEVICE AND MEDIUM

CROSS-REFERENCE TO RELATED APPLICATION

The application claims the priority of the Chinese patent application filed on Jun. 5, 2020 before the CNIPA, China National Intellectual Property Administration with the application number of 202010505017.8 and the title of "METHOD FOR DILUTING CACHE SPACE, AND DEVICE AND MEDIUM", which is incorporated herein in its entirety by reference.

FIELD

The present application relates to the field of buffer memory, and in particular to a method and device for diluting a cache space, and a storage medium.

BACKGROUND

In the era of Big Data, the speed of data processing in production is more and more demanding. In addition to the improvement on the engine, buffer technology is undoubtedly paid more and more attention. The development of buffer technology greatly improves the speed of data interaction. However, the buffer memory cannot be used as a persistent disk. There is a process of data expiration in the buffer memory. Existing data expiration clearing strategies are linear and result in data failure, which is easy to cause the phenomenon of buffer avalanche.

SUMMARY

In view of the above, in order to overcome at least one aspect of the above problems, the embodiments of the present application provide a method for diluting a cache space, including:

performing a data deletion on a queue with a maximum length in the cache space at a preset initial speed in response to a trigger to dilute the cache space;

triggering the data deletion on a plurality of queues in response to the length of the queue with the maximum length for data deletion being equal to the length of the plurality of queues in the cache space;

calculating an apportioning speed by using the quantity of all queues that are triggered the data deletion and the preset initial speed;

performing the data deletion on each queue that is triggered the data deletion at the apportioning speed;

triggering the operation of performing the data deletion on a plurality of other queues and returning for calculating the apportioning speed in response to the length of all the queues for data deletion being equal to the length of the plurality of other queues in the cache space; and pausing the process of data deletion of all queues that are triggered the data deletion in response to a trigger to stop diluting the cache space.

In an embodiment of the present application, the performing a data deletion on a queue with a maximum length in the cache space at a preset initial speed in response to a trigger to dilute the cache space further includes:

determining a plurality of queues waiting for the data deletion in the cache space according to a buffer data expiration strategy; and performing the data deletion on the queue with the maximum length among the plurality of queues.

In an embodiment of the present application, the performing a data deletion on a queue with a maximum length in the cache space at a preset initial speed in response to a trigger to dilute the cache space further includes:

detecting whether the volume of data buffered in the cache space reaches a threshold value or determining whether an instruction sent by a user to dilute the cache space is received; and triggering to dilute the cache space in response to the volume of data buffered in the cache space reaching the threshold value or receiving the instruction sent by the user to dilute the cache space.

In an embodiment of the present application, the performing a data deletion on a queue with a maximum length in the cache space at a preset initial speed or the performing the data deletion on each queue that is triggered the data deletion at the apportioning speed further includes:

randomly marking data in the queues that are triggered the data deletion; and merging and deleting randomly marked data.

In an embodiment of the present application, the performing a data deletion on a queue with a maximum length in the cache space at a preset initial speed or the performing the data deletion on each queue that is triggered the data deletion at the apportioning speed further includes:

determining a deletion priority of data in the queues that are triggered the data deletion, and marking the data according to the deletion priority; and merging and deleting marked data.

Based on the same inventive concept, according to another aspect of the present application, the embodiment of the present application also provides a computer device, including:

at least one processor; and a memory storing a computer program executable on the processor, wherein the processor performs the following operations when executing the program:

performing a data deletion on a queue with a maximum length in a cache space at a preset initial speed in response to a trigger to dilute the cache space;

triggering the data deletion on a plurality of queues in response to the length of the queue with the maximum length for data deletion being equal to the length of the plurality of queues in the cache space;

calculating an apportioning speed by using the quantity of all queues that are triggered the data deletion and the preset initial speed;

performing the data deletion on each queue that is triggered the data deletion at the apportioning speed;

triggering the operation of performing the data deletion on a plurality of other queues and returning for calculating the apportioning speed in response to the length of all the queues for data deletion being equal to the length of the plurality of other queues in the cache space; and pausing the process of data deletion of all queues that are triggered the data deletion in response to a trigger to stop diluting the cache space.

In an embodiment of the present application, the performing a data deletion on a queue with a maximum length in a cache space at a preset initial speed in response to a trigger to dilute the cache space further includes:

determining a plurality of queues waiting for the data deletion in the cache space according to a buffer data expiration strategy; and performing the data deletion on the queue with the maximum length among the plurality of queues.

In an embodiment of the present application, the performing a data deletion on a queue with a maximum length in a cache space at a preset initial speed in response to a trigger to dilute the cache space further includes:

detecting whether the volume of data buffered in the cache space reaches a threshold value or determining whether an instruction sent by a user to dilute the cache space is received; and triggering to dilute the cache space in response to the volume of data buffered in the cache space reaching the threshold value or receiving the instruction sent by the user to dilute the cache space.

In an embodiment of the present application, the performing a data deletion on a queue with a maximum length in the cache space at a preset initial speed or the performing the data deletion on each queue that is triggered the data deletion at the apportioning speed further includes:

randomly marking data in the queues that are triggered the data deletion; and merging and deleting randomly marked data.

Based on the same inventive concept, according to another aspect of the present application, the embodiment of the present application also provides a computer-readable storage medium, storing a computer program, wherein the computer program, when executed by a processor, performs the operations of the method according to any one of the above descriptions.

The present application has one of the following beneficial technical effects: the solution provided by the present application enables the original buffered data to be saved to the maximum extent by apportioning the data to be deleted to each eligible queue, resulting in the generalized failure of data buffered rather than the centralized failure of a certain queue or a certain part of data. It may minimize the occurrence of the phenomenon of data avalanche and effectively avoid downtimes in the production environment.

BRIEF DESCRIPTION OF THE DRAWINGS

In order to more clearly explain the embodiments of the present application or the technical solutions in the prior art, the following will briefly introduce the drawings needed to be used in the embodiments or the prior technical description. Obviously, the drawings in the following description are only some embodiments of the present application. For ordinary technicians in the field, they may also obtain other embodiments according to these drawings without paying creative labor.

DETAILED DESCRIPTION OF THE EMBODIMENTS

In order to make the purpose, technical solutions and advantages of the present application clearer, the embodiments of the present application are further described in detail below in combination with specific embodiments and with reference to the drawings.

It should be noted that all expressions of "first" and "second" in the embodiments of the present application are used to distinguish two entities with the same name but not the same or different parameters. It can be seen that "first" and "second" are only for the convenience of expression, and should not be understood as limiting the embodiments of the present application, and subsequent embodiments will not explain them one by one.

In the embodiments of the present application, when data need to be buffered, the data are buffered in a cache space. Each batch (for example, a batch of data within a time range, for example, within five seconds) is sent as a unit to the cache space. Different batches of data are placed in different queues in the cache space. Since the size of each queue is determined by the volume of data buffered and the volume of data buffered of each batch is different, each queue has a different size.

Figure 1:
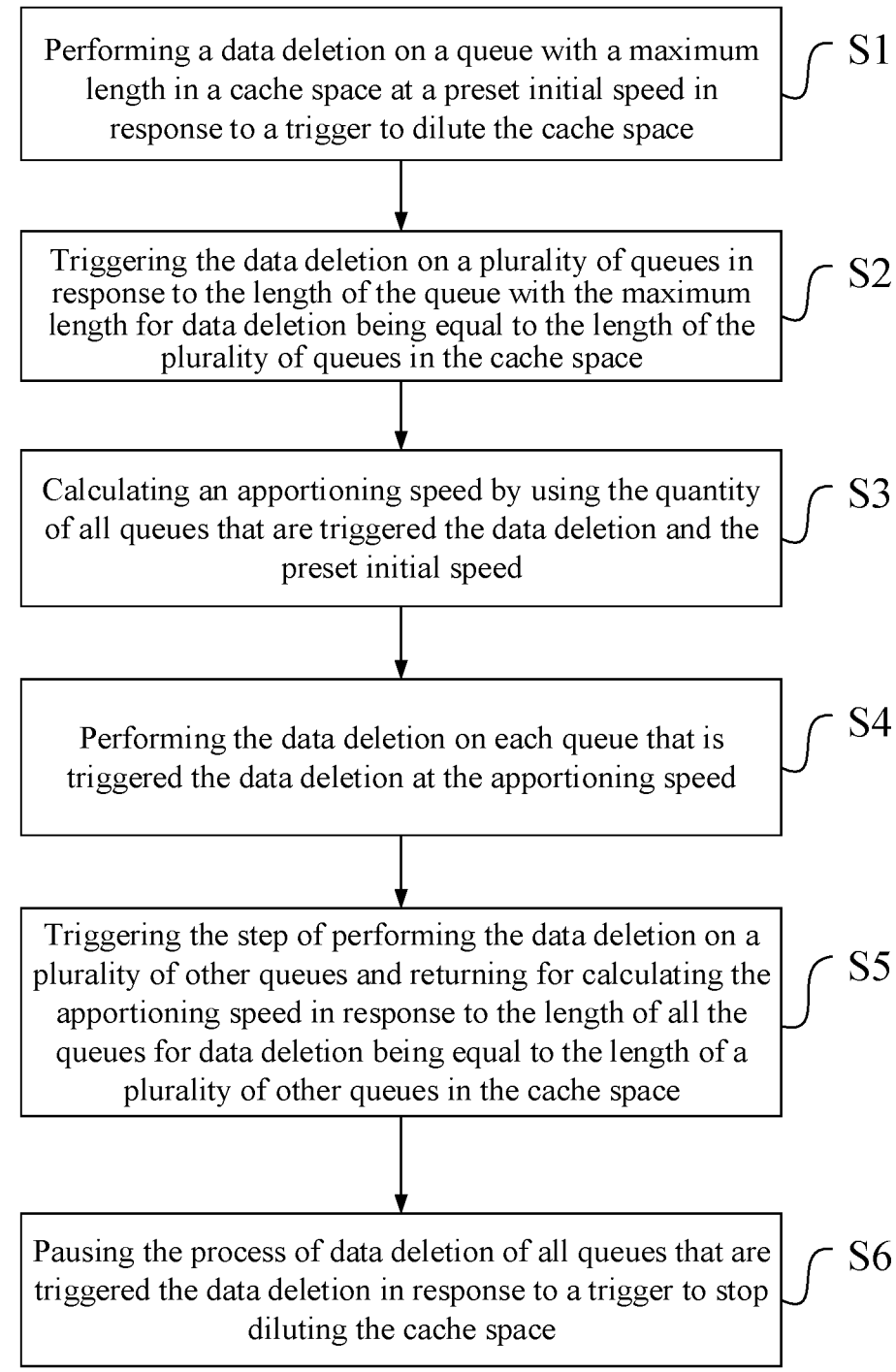
FIG. 1 is a flow chart of a method for diluting a cache space provided by the embodiments of the present application.

According to an aspect of the present application, the embodiments of the present application provide a method for diluting the cache space, as shown in FIG. 1, which may include the following steps: S1, performing a data deletion on a queue with a maximum length in the cache space at a preset initial speed in response to a trigger to dilute the cache space; S2, triggering the data deletion on a plurality of queues in response to the length of the queue with the maximum length for data deletion being equal to the length of the plurality of queues in the cache space; S3, calculating an apportioning speed by using the quantity of all queues that are triggered the data deletion and the preset initial speed; S4, performing the data deletion on each queue that is triggered the data deletion at the apportioning speed; S5, triggering the operation of performing the data deletion on a plurality of other queues and returning for calculating the apportioning speed in response to the length of all the queues for data deletion being equal to the length of the plurality of other queues in the cache space; and S6, pausing the process of data deletion of all queues that are triggered the data deletion in response to a trigger to stop diluting the cache space.

The solution provided by the present application enables the original buffered data to be saved to the maximum extent by apportioning the data to be deleted to each eligible queue, resulting in the generalized failure of data buffered rather than the centralized failure of a certain queue or a certain part of data. It may minimize the occurrence of the phenomenon of data avalanche and effectively avoid downtimes in the production environment.

In some embodiments, in the step S1, the performing a data deletion on a queue with a maximum length in the cache space at a preset initial speed in response to a trigger to dilute the cache space further includes:

determining a plurality of queues waiting for the data deletion in the cache space according to a buffer data expiration strategy; and performing the data deletion on the queue with the maximum length among the plurality of queues.

The buffer expiration strategy may be first input first output (FIFO), least frequently used (LFU) and least recently used (LRU). Here, FIFO refers to that the data which enters the cache first will be cleared out first under the condition that the cache space is not enough (when it exceeds a maximum element limit). LFU refers to that the least frequently used elements will be cleared out which requires the buffered elements to have an attribute of hit value, and the element with the minimum hit value will be cleared out under the condition that the cache space is not enough. LRU refers to that the least recently used, buffered elements having a timestamp, and the existing buffered element of which the timestamp is farthest from the current time will be cleared out under the condition that the cache is full and needs to make room for buffering new elements.

In this way, the plurality of queues that are given a priority to the data deletion are determined according to the buffer data expiration strategy so as to perform the data deletion on the queue with the maximum length among the plurality of queues.

It should be noted that it is also possible to select a queue with the maximum length among all queues in the cache space to perform the data deletion. That is to say, all queues may be directly cleared without firstly determining the plurality of queues that are given the priority to the data deletion by the buffer expiration strategy.

In some embodiments, in the step S1, the performing a data deletion on a queue with a maximum length in the cache space at a preset initial speed in response to a trigger to dilute the cache space further includes:

detecting whether the volume of data buffered in the cache space reaches a threshold value or determining whether an instruction sent by a user to dilute the cache space is received; and triggering to dilute the cache space in response to the volume of data buffered in the cache space reaching the threshold value or receiving the instruction sent by the user to dilute the cache space.

The clearing of the cache space may be triggered in a variety of ways, including, but not limited to, by setting the threshold value of the cache space, triggering to dilute and clear the cache space under the condition that the volume of data buffered in the cache space reaches the threshold value. Alternatively, under the condition that a user wants to manually trigger the clearing of the cache space, an instruction for clearing the cache space may be directly issued for triggering to dilute and clear the cache space when the cache space receives the corresponding instruction.

In some embodiments, in the step S2, the data deletion is triggered on the plurality of queues in response to the length of the queue with the maximum length for data deletion being equal to the length of the plurality of queues in the cache space. And the data deletion is triggered on one or more queues when the length of the queue with the maximum length after data deletion is reduced to be equal to the length of one or more queues in the cache space.

In some embodiments, in the step S3, an apportioning speed is calculated by using the quantity of all queues that are triggered the data deletion and the preset initial speed. And the sum of all data deletion speeds of all queues with the data deletion is the initial speed. Thus, under the condition that there are other queues that are triggered the data deletion, the data deletion speed of the queue with the maximum length becomes slow as being apportioned by other queues at this moment.

It should be noted that the apportioning speed may be obtained through dividing the preset initial speed by the quantity of queues that are triggered the data deletion.

In some embodiments, in the step S5, the operation of performing the data deletion on the plurality of other queues and returning for calculating the apportioning speed is triggered in response to the length of all the queues for data deletion being equal to the length of the plurality of other queues in the cache space. In the step S3, after new queues are triggered the data deletion, the data deletion on other one or more queues without the data deletion is triggered under the condition that the length of all the queues after the data deletion is equal to the length of other one or more queues without the data deletion in the cache space.

For example, the data deletion is performed on a queue Q1 with the maximum length in the cache space at the preset initial speed in response to the trigger to dilute and clear the data in the cache space. Under the condition that the length of the queue Q1 with the maximum length is equal to the length of a queue Q2, the data deletion is triggered on the queue Q2 and the data deletion is respectively performed on the queues Q1 and Q2 at the apportioning speed by dividing the preset initial speed by 2. Under the condition that the length of the queues Q1 and Q2 is equal to the length of the queue Q3, the data deletion is triggered on the queue Q3 and the data deletion is respectively performed on the queues Q1, Q2 and Q3 at the apportioning speed by dividing the preset initial speed by 3, and so on. Certainly, the length of all the queues after data deletion may also be equal to the length of the plurality of queues without the data deletion in the cache space. Namely, after the data deletion is performed on the queue Q1 with the maximum length in the cache space at the preset initial speed, the length of the queue Q1 with the maximum length may be equal to the length of the queues Q2 and Q3. At this time, the data deletion is respectively performed on the queues Q1, Q2 and Q3 at the apportioning speed by dividing the preset initial speed by 3. Thus, a data diluting speed on the Q1 is apportioned by other queues and slow down to achieve a non-linear data clearing.

In some embodiments, in the step S6, the process of data deletion of all queues that are triggered the data deletion is paused in response to a trigger to stop diluting the cache space. Under the condition that the volume of data buffered in the cache space is less than a safety threshold value after performing data deletion on the queue, it triggers to stop diluting and clearing the cache space. Alternatively, under the condition that the user wants to manually trigger to stop diluting and clearing of the cache space, an instruction to stop clearing the cache space may be directly issued. Under the condition that the cache space receives the corresponding instruction, it triggers to pause diluting and clearing the cache space.

In some embodiments, the performing a data deletion on a queue with a maximum length in the cache space at a preset initial speed or the performing the data deletion on each queue that is triggered the data deletion at the apportioning speed further includes:

randomly marking data in the queues that are triggered the data deletion; and merging and deleting randomly marked data.

Each queue that is triggered to clear data may be randomly marked with data to be deleted (a marking speed is the preset initial speed or the apportioning speed) and then the marked data are merged and deleted. Thereby the cache space is released and the length of the queues is changed.

In some embodiments, the performing a data deletion on a queue with a maximum length in the cache space at a preset initial speed or the performing the data deletion on each queue that is triggered the data deletion at the apportioning speed further includes:

determining a deletion priority of data in the queues that are triggered the data deletion, and marking the data according to the deletion priority; and merging and deleting the marked data.

Each queue that is triggered to clear data may be determined the priority of data deletion by some attributes of data (for example, the attribute of hit value) in the queue. The data waiting to be deleted are marked according to the priority of deletion (the marking speed is the preset initial speed or the apportioning speed). Then, the marked data are merged and deleted to release the cache space and change the length of the queues.

The solution provided by the present application enables the original buffered data to be saved to the maximum extent by apportioning the data to be deleted to each eligible queue, resulting in the generalized failure of data buffered rather than the centralized failure of a certain queue or a certain part of data. It may minimize the occurrence of the phenomenon of data avalanche and effectively avoid downtimes in the production environment.

Figure 2:
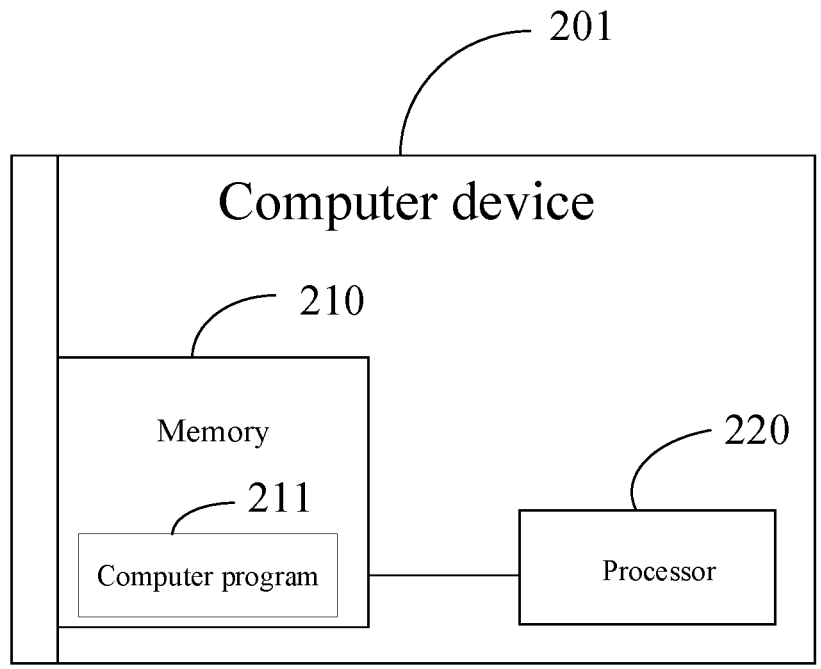
FIG. 2 is a structure diagram of a computer device provided by the embodiments of the present application.

Based on the same inventive concept, according to another aspect of the present application, as shown in FIG. 2, the embodiments of the present application also provide a computer device 201 including:

at least one processor 220; and a memory 210 storing a computer program 211 executable on the processor, wherein the processor 220 performs any operation of the method for diluting the cache space as above when executing the program.

Figure 3:
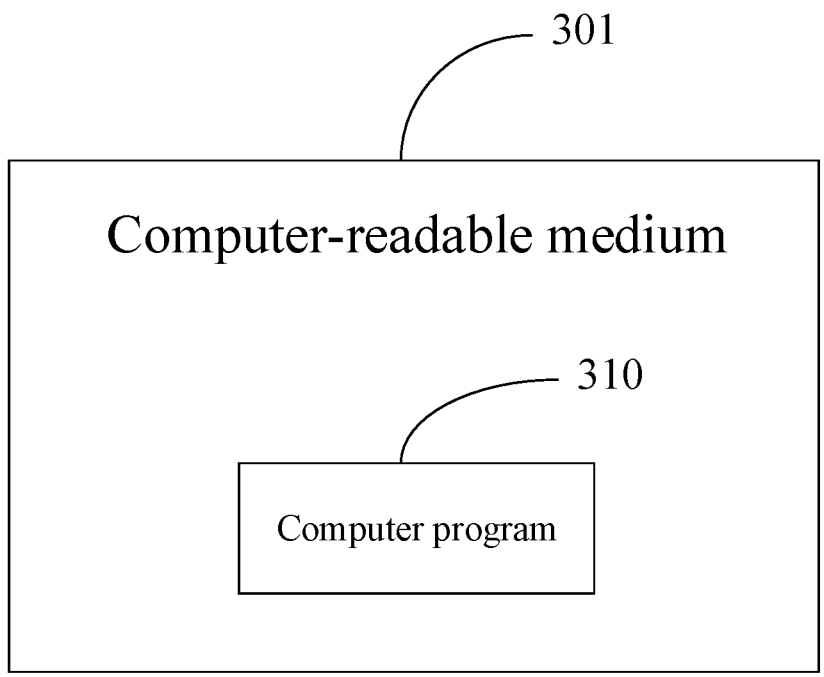
FIG. 3 is a structure diagram of a computer-readable storage medium provided by the embodiments of the present application.

Based on the same inventive concept, according to another aspect of the present application, as shown in FIG. 3, the embodiments of the present application also provide a computer-readable storage medium 301 storing a computer program instruction 310 which performs any operation of the method for diluting the cache space as above when executed by a processor.

Finally, it should be noted that those skilled in the art may understand that all or part of the processes in the above embodiment methods may be realized by instructing relevant hardware through computer programs. The programs may be stored in a computer readable storage medium. When the program is executed, it may include the processes of the embodiments of the above methods. Among them, the storage medium may be disk, optical disk, read only memory (ROM) or random access memory (RAM). The embodiments of the above computer programs may achieve the same or similar effects as the corresponding embodiments of any of the above methods.

In addition, typically, the devices, apparatuses, etc., disclosed in the embodiments of the present application may be various electronic terminal devices, such as mobile phones, personal digital assistants (PDA), tablets (PAD, portable android device), smart televisions, etc., or large terminal devices, such as servers, etc. Therefore, the protection scope disclosed in the embodiments of the present application should not be limited to a specific type of devices and apparatuses. The client-side disclosed in the embodiment of the present application may be applied to any of the above electronic terminal devices in the form of electronic hardware, computer software or a combination of both.

In addition, the method disclosed according to the embodiment of the present application may also be implemented as a computer program executed by a CPU (central processing unit), which may be stored in a computer-readable storage medium. When the computer program is executed by the CPU, the above functions defined in the method disclosed in the embodiment of the present application are executed.

In addition, the above method steps and the system unit may also be realized by using a controller and a computer-readable storage medium for storing a computer program that enables the controller to realize the above steps or unit functions.

Further, it should be understood that the computer-readable storage medium (e. G., memory) herein may be volatile memory or non-volatile memory, or may include both volatile memory and non-volatile memory. As an example, but not a limitation, nonvolatile memory may include read-only memory (ROM), programmable ROM (PROM, programmable read only memory), electrically programmable rom (EPROM, erasable programmable read only memory), electrically erasable programmable rom (EEPROM, electrically erasable programmable read only memory), or flash memory. The volatile memory may include random access memory (RAM), which may act as external cache memory. As an example, RAM may be obtained in many forms, such as SRAM (static random access memory), RAM (dynamic random access memory), DRAM (synchronous dynamic random access memory), DDR DRAM (double data rate synchronous dynamic random access memory) enhanced synchronous dynamic random access memory (SDRAM), sync link dynamic random access memory (SLDRAM), and direct Rambus RAM (RDRAM). The storage devices of the disclosed aspects are intended to include, but are not limited to, these and other suitable types of memories.

Those skilled in the art will also understand that various exemplary logical blocks, modules, circuits, and algorithm steps described in connection with the disclosure herein may be implemented as electronic hardware, computer software, or a combination of both. In order to clearly illustrate the interchangeability of hardware and software, the functions of various schematic components, blocks, modules, circuits and steps have been generally described. Whether this function is implemented as software or hardware depends on the specific application and the design constraints imposed on the whole system. Those skilled in the art may implement functions in various ways for each specific application, but such implementation decisions should not be interpreted as leading to departure from the scope disclosed in the embodiments of the present application.

The various exemplary logic blocks, modules, and circuits described in connection with the disclosure herein may be implemented or executed using the following components designed to perform the functions herein: general purpose processors, digital signal processors, application specific integrated circuits, field programmable gate arrays, or other programmable logic devices discrete gate or transistor logic, discrete hardware components, or any combination of these components. A general-purpose processor may be a microprocessor, but alternatively, the processor may be any conventional processor, controller, microcontroller, or state machine. A processor may also be implemented as a combination of computing devices, for example, a combination of DSP and microprocessors, a plurality of microprocessors, one or more microprocessors in combination with DSP and/or any other such configuration.

The steps of the method or algorithm described in connection with the disclosure herein may be directly included in hardware, a software module executed by a processor, or a combination of the two. The software module may reside in ram memory, flash memory, ROM memory, EPROM memory, EEPROM memory, registers, hard disks, removable disks, CD-ROM (compact disc read only memory), or any other form of storage media known in the art. An exemplary storage medium is coupled to a processor so that the processor may read information from or write information to the storage medium. In an alternative, the storage medium may be integrated with the processor. The processor and storage medium may reside in the ASIC. ASICs may reside in user terminals. In an alternative, the processor and storage medium may reside in the user terminal as discrete components.

In one or more exemplary designs, functions may be implemented in hardware, software, firmware, or any combination thereof. If implemented in software, functions may be stored on or transmitted through a computer-readable medium as one or more instructions or code. The computer-readable medium includes a computer storage medium and a communication medium, which includes any medium that facilitates the transfer of a computer program from one location to another. The storage medium may be any available medium that may be accessed by a general-purpose or dedicated computer. By way of example and not limitation, the computer-readable medium may include RAM, ROM, EEPROM, CD-ROM or other optical disk storage devices, disk storage devices or other magnetic storage devices, or any other medium that may be used to carry or store required program codes in the form of instructions or data structures and may be accessed by a general-purpose or dedicated computer or a general-purpose or dedicated processor. Furthermore, any connection may be appropriately referred to as a computer-readable medium. For example, if coaxial cable, optical fiber cable, twisted pair, digital subscriber line (DSL) or wireless technologies such as infrared, radio and microwave are used to send software from a website, server or other remote source, the above coaxial cable, optical fiber cable, twisted pair, DSL or wireless technologies such as infrared, radio and microwave are included in the definition of media. As used here, disks and optical disks include compact disks, laser disks, optical disks, digital multi-function disks (DVD, digital video disc), floppy disks, and blue optical disks, where disks usually reproduce data magnetically, while optical disks reproduce data optically using lasers. The combination of the above contents shall also be included in the scope of computer-readable media.

The above is an exemplary embodiment of the present application, but it should be noted that various changes and modifications may be made without departing from the scope of the embodiments disclosed in the claims.

The functions, steps and/or actions of the method claims according to the disclosed embodiments described herein need not be performed in any particular order. In addition, although the elements disclosed in the embodiments of the present application may be described or required in individual form, they may also be understood as multiple unless they are explicitly limited to the singular number.

It should be understood that, as used herein, the singular form "a" is intended to include the plural form as well, unless the context clearly supports exceptions. It should also be understood that "and/or" as used herein refers to any and all possible combinations including one or more items listed in association.

The above embodiments of the present application disclose the serial number of the embodiments only for description and do not represent the advantages and disadvantages of the embodiments.

Those skilled in the art may understand that all or part of the steps to implement the above embodiments may be completed by hardware, or may be completed by instructing relevant hardware through programs. The programs may be stored in a computer-readable storage medium, which may be a read-only memory, a disk or an optical disk.

Those skilled in the art should understand that the discussion of any of the above embodiments is only illustrative and is not intended to imply that the scope of disclosure of embodiments of the present application (including claims) is limited to these examples; under the idea of embodiments of the present application, the above embodiments or the technical features in different embodiments may also be combined, and there are many other changes in different aspects of the above embodiments of the present application, which are not provided in details for simplicity. Therefore, any omission, modification, equivalent replacement, improvement, etc., made within the spirit and principles of the embodiments of the present application shall be included in the protection scope of the embodiments of the present application.

The invention claimed is:

1. A method for diluting a cache space, comprising:
performing a data deletion on a first queue with a maximum length in the cache space at a preset initial speed in response to a trigger to dilute the cache space;
triggering the data deletion on a second queue in response to a length of the first queue with the maximum length for the data deletion being equal to a length of the second queue in the cache space;
calculating an apportioning speed by using a quantity of all the first and second queues that are triggered the data deletion and the preset initial speed;
performing the data deletion on each of the first and second queues that are triggered the data deletion at the apportioning speed;
triggering an operation of performing the data deletion on a third queue;
calculating the apportioning speed in response to each length of all the first and second queues for the data deletion being equal to a length of the third queue in the cache space; and
pausing a process of the data deletion of all the first, second, and third queues that are triggered the data deletion in response to a trigger to stop diluting the cache space.

2. The method according to claim 1, wherein the performing a data deletion on a first queue with a maximum length in the cache space at a preset initial speed in response to a trigger to dilute the cache space further comprises:
determining a plurality of queues waiting for the data deletion in the cache space according to a buffer data expiration strategy; and
performing the data deletion on the first queue with the maximum length among the plurality of queues.

3. The method according to claim 1, wherein the performing a data deletion on a first queue with a maximum length in the cache space at a preset initial speed in response to a trigger to dilute the cache space further comprises:
detecting whether the volume of data buffered in the cache space reaches a threshold value or determining whether an instruction sent by a user to dilute the cache space is received; and
triggering to dilute the cache space in response to the volume of data buffered in the cache space reaching the threshold value or receiving the instruction sent by the user to dilute the cache space.

4. The method according to claim 1, wherein the performing a data deletion on a first queue with a maximum length in the cache space at a preset initial speed or the performing the data deletion on each of the first and second queues that are triggered the data deletion at the apportioning speed further comprises:
randomly marking data in the first and second queues that are triggered the data deletion; and merging and deleting the randomly marked data.

5. The method according to claim 1, wherein the performing a data deletion on a first queue with a maximum length in the cache space at a preset initial speed or the performing the data deletion on each of the first and second queues that are triggered the data deletion at the apportioning speed further comprises:
- determining a deletion priority of data in the first and second queues that are triggered the data deletion, and marking the data according to the deletion priority; and
- merging and deleting the marked data.

6. A computer device, comprising:
- at least one processor; and
- a memory storing a computer program executable on the processor, wherein the processor performs the following operations when executing the program:
  - performing a data deletion on a first queue with a maximum length in a cache space at a preset initial speed in response to a trigger to dilute the cache space;
  - triggering the data deletion on a second queue in response to a length of the first queue with the maximum length for the data deletion being equal to a length of the second queue in the cache space;
  - calculating an apportioning speed by using a quantity of all the first and second queues that are triggered the data deletion and the preset initial speed;
  - performing the data deletion on each of the first and second queues that are triggered the data deletion at the apportioning speed;
  - triggering an operation of performing the data deletion on a third queue;
  - calculating the apportioning speed in response to each length of all the first and second queues for the data deletion being equal to a length of the third queue in the cache space; and
  - pausing a process of the data deletion of all the first, second, and third queues that are triggered the data deletion in response to a trigger to stop diluting the cache space.

7. The device according to claim 6, wherein the performing a data deletion on a first queue with a maximum length in a cache space at a preset initial speed in response to a trigger to dilute the cache space further comprises:
- determining a plurality of queues waiting for the data deletion in the cache space according to a buffer data expiration strategy; and
- performing the data deletion on the first queue with the maximum length among the plurality of queues.

8. The device according to claim 6, wherein the performing a data deletion on a first queue with a maximum length in a cache space at a preset initial speed in response to a trigger to dilute the cache space further comprises:
- detecting whether the volume of data buffered in the cache space reaches a threshold value or determining whether an instruction sent by a user to dilute the cache space is received; and
- triggering to dilute the cache space in response to the volume of data buffered in the cache space reaching the threshold value or receiving the instruction sent by the user to dilute the cache space.

9. The device according to claim 6, wherein the performing a data deletion on a first queue with a maximum length in the cache space at a preset initial speed or the performing the data deletion on each of the first and second queues that are triggered the data deletion at the apportioning speed further comprises:
- randomly marking data in the first and second queues that are triggered the data deletion; and merging and deleting the randomly marked data.

10. A computer-readable storage medium, storing a computer program, wherein the computer program, when executed by a processor, performs the operations comprising:
- performing a data deletion on a first queue with a maximum length in a cache space at a preset initial speed in response to a trigger to dilute the cache space;
- triggering the data deletion on a second queue in response to a length of the first queue with the maximum length for the data deletion being equal to a length of the second queue in the cache space;
- calculating an apportioning speed by using a quantity of all the first and second queues that are triggered the data deletion and the preset initial speed;
- performing the data deletion on each of the first and second queues that are triggered the data deletion at the apportioning speed;
- triggering an operation of performing the data deletion on a third queue;
- calculating the apportioning speed in response to each length of all the first and second queues for the data deletion being equal to a length of the third queue in the cache space; and
- pausing a process of the data deletion of all the first, second, and third queues that are triggered the data deletion in response to a trigger to stop diluting the cache space.

11. The method according to claim 1, wherein the apportioning speed is obtained through dividing the preset initial speed by the quantity of all queues that are triggered the data deletion.

12. The method according to claim 1, wherein the pausing the process of data deletion of all queues that are triggered the data deletion in response to a trigger to stop diluting the cache space comprises:
- under the condition that volume of data buffered in the cache space is less than a safety threshold value after performing data deletion on the first queue, or, under the condition that the cache space receives an instruction to stop clearing the cache space sent by a user manually, triggering to stop diluting the cache space.

13. The method according to claim 4, wherein a marking speed is the preset initial speed or the apportioning speed.

14. The device according to claim 6, wherein the performing a data deletion on a first queue with a maximum length in the cache space at a preset initial speed or the performing the data deletion on each queue that is triggered the data deletion at the apportioning speed further comprises:
- determining a deletion priority of data in all queues that are triggered the data deletion, and marking the data according to the deletion priority; and
- merging and deleting the marked data.

15. The device according to claim 6, wherein the apportioning speed is obtained through dividing the preset initial speed by the quantity of all queues that are triggered the data deletion.

16. The device according to claim 9, wherein a marking speed is the preset initial speed or the apportioning speed.

17. The computer-readable storage medium according to claim 10, wherein the performing a data deletion on a first queue with a maximum length in the cache space at a preset initial speed in response to a trigger to dilute the cache space further comprises:
- determining a plurality of queues waiting for the data deletion in the cache space according to a buffer data expiration strategy; and performing the data deletion on the first queue with the maximum length among the plurality of queues.

18. The computer-readable storage medium according to claim 10, wherein the performing a data deletion on a first queue with a maximum length in the cache space at a preset initial speed in response to a trigger to dilute the cache space further comprises:

detecting whether the volume of data buffered in the cache space reaches a threshold value or determining whether an instruction sent by a user to dilute the cache space is received; and triggering to dilute the cache space in response to the volume of data buffered in the cache space reaching the threshold value or receiving the instruction sent by the user to dilute the cache space.

19. The computer-readable storage medium according to claim 10, wherein the performing a data deletion on a first queue with a maximum length in the cache space at a preset initial speed or the performing the data deletion on each queue that is triggered the data deletion at the apportioning speed further comprises:

randomly marking data in the first and second queues that are triggered the data deletion; and merging and deleting the randomly marked data.

20. The computer-readable storage medium according to claim 10, wherein the performing a data deletion on a first queue with a maximum length in the cache space at a preset initial speed or the performing the data deletion on each queue that is triggered the data deletion at the apportioning speed further comprises:

determining a deletion priority of data in the first and second queues that are triggered the data deletion, and marking the data according to the deletion priority; and merging and deleting the marked data.

* * * * *